No. 660,701. Patented Oct. 30, 1900.
A. HITT.
WAGON RUNNING GEAR.
(Application filed Apr. 25, 1898. Renewed Apr. 9, 1900.)

(No Model.) 2 Sheets—Sheet 1.

WITNESSES:
Wm P. Goebel.
E. Jos. Belknap.

INVENTOR
Adrian Hitt,
BY
Chas. C. Gill
ATTORNEY

No. 660,701. Patented Oct. 30, 1900.
A. HITT.
WAGON RUNNING GEAR.
(Application filed Apr. 25, 1898. Renewed Apr. 9, 1900.)
(No Model.) 2 Sheets—Sheet 2.
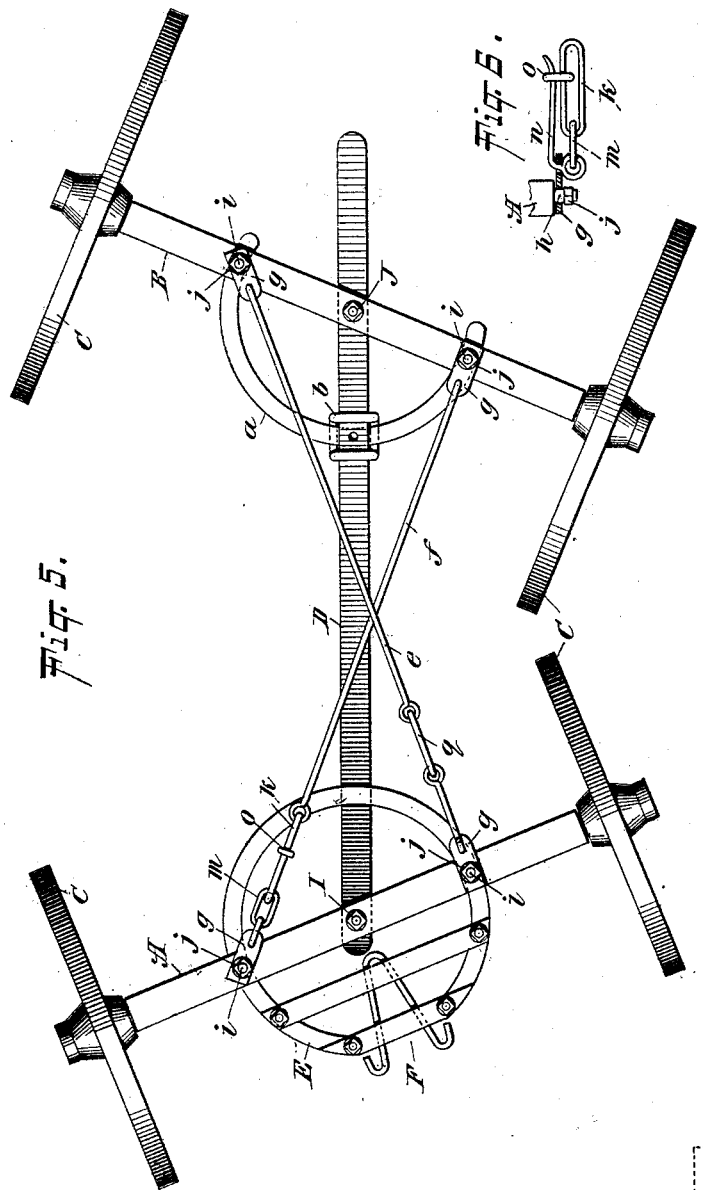
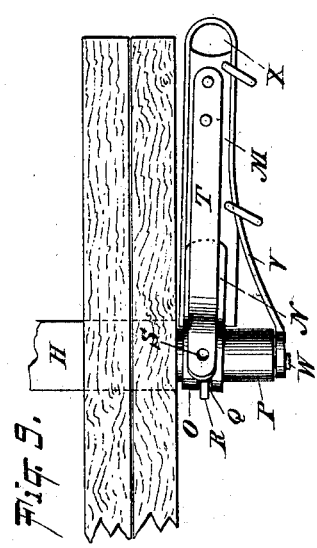
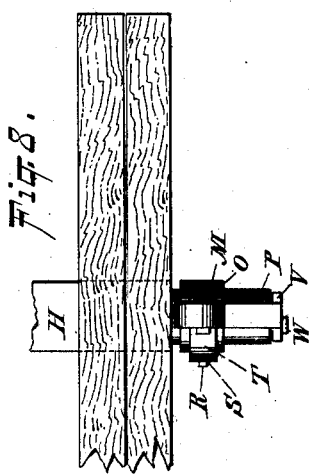
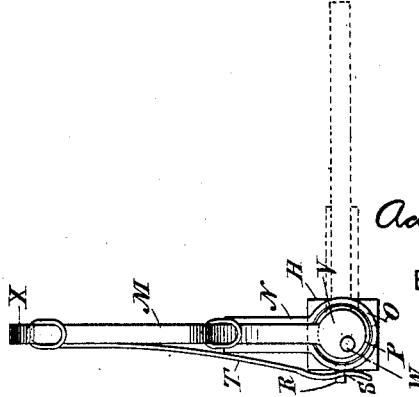
WITNESSES:
William P. Goebel
E. Jos. Belknap.
INVENTOR
Adrian Hitt,
BY
Chas. O. Gill
ATTORNEY
THE NORRIS PETERS CO., PHOTO-LITHO., WASHINGTON, D. C.

UNITED STATES PATENT OFFICE.

ADRIAN HITT, OF JERSEY CITY, NEW JERSEY, ASSIGNOR TO HENRY BERG, OF ORANGE VALLEY, NEW JERSEY.

WAGON RUNNING-GEAR.

SPECIFICATION forming part of Letters Patent No. 660,701, dated October 30, 1900.

Application filed April 25, 1898. Renewed April 9, 1900. Serial No. 12,042. (No model.)

*To all whom it may concern:*

Be it known that I, ADRIAN HITT, a citizen of the United States, and a resident of Jersey City, in the county of Hudson and State of New Jersey, have invented certain new and useful Improvements in Wagons, of which the following is a specification.

The invention relates to improvements in wagons; and it consists in the novel features and combinations of parts hereinafter described, and particularly pointed out in the claims.

The invention pertains to several features of the wagon, one of the features being the providing of a semicircular rear hound whose ends are secured between the sand-board and rear axle and whose circular portion extends forward and carries a loop through which the wagon-reach may pass, said loop being adapted to move with said reach during the turning of the rear axle. The front and rear axles of the wagon are connected by crossed rods of the character hereinafter described by which when desired both the front and rear axles may turn on radial lines during the turning of the wagon around a curve, these crossed rods enabling the wagon to make a very short turn. The crossed rods above referred to may be detached when desired, and the aforesaid hound may then be connected with the wagon-reach by a suitable pin, and thereby the rear axle may be locked in stationary position.

The various details of construction entering into the embodiment of the present invention will be fully understood from the description hereinafter given, reference being had to the accompanying drawings, in which—

Figure 1:
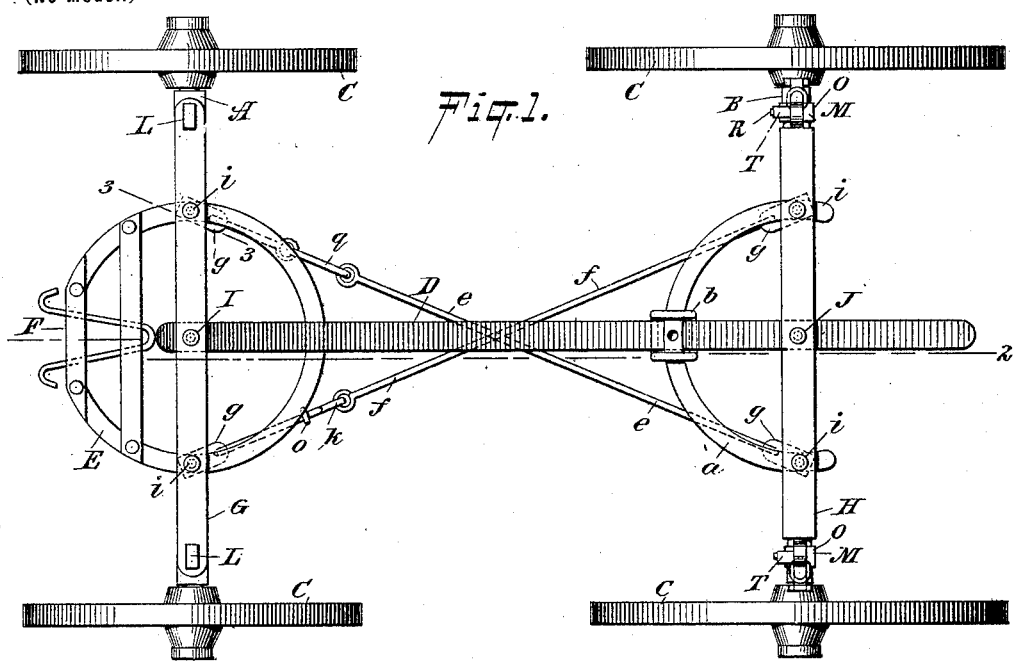
Figure 2:
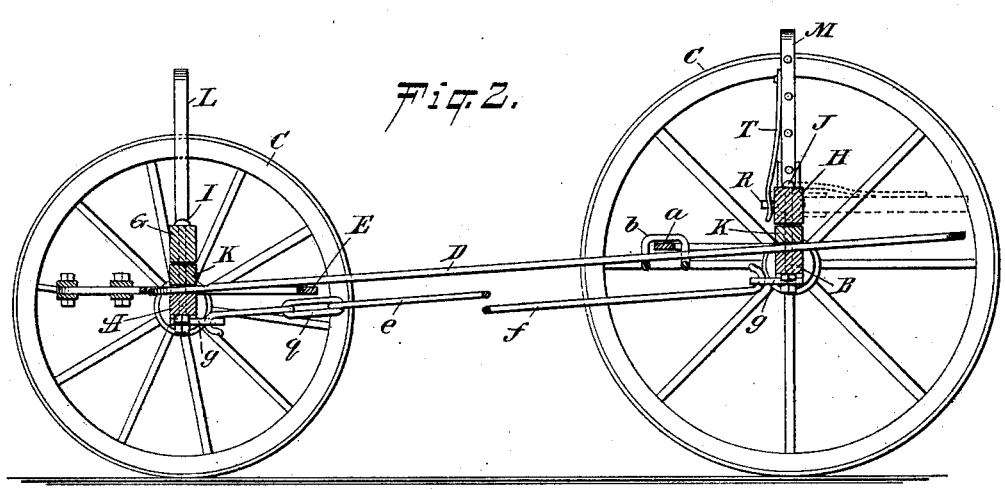
Figure 3:
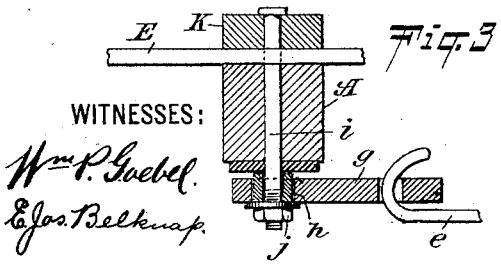
Figure 4:
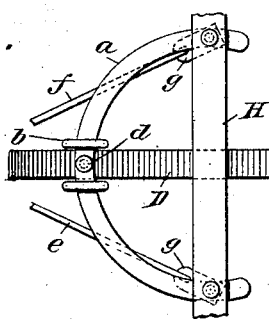

Figure 1 is a top view of a wagon constructed in accordance with and embodying the invention. Fig. 2 is a vertical longitudinal section of same on the dotted line 2 2 of Fig. 1. Fig. 3 is an enlarged detached sectional view of a portion of same on the dotted line 3 3 of Fig. 1. Fig. 4 is a detached top view of a portion of the wagon and showing the manner of connecting the rear hound and wagon-reach together by means of a pin, this pin being omitted from Fig. 1. Fig. 5 is a bottom view of the wagon, and illustrates the position of the parts when the rear hound is not connected with the wagon-reach and the wagon is making a turn. Fig. 6 is a detached side elevation of the connecting means at one end of the crossed rods which connect the front and rear axles of the wagon. Fig. 7 is a side elevation of a portion of the wagon, and more particularly illustrates the end of the bolster with the standard thereon, the dotted lines indicating the position of the standard when turned downward and rearward. Fig. 8 is a top view of the portion of the wagon illustrated in Fig. 7, and in Fig. 8 two boards are shown resting upon the bolster; and Fig. 9 is a like view of same, but illustrates the standard as having been turned downward and rearward and as having been pulled slightly outward, so as to free itself from the load resting on the bolster.

In the drawings, A B respectively designate the front and rear axles of the wagon; C, the wheels on said axles; D, the wagon-reach, and E the usual circular front hound, within the socket F of which is placed the rear end of the usual wagon-tongue. (Not shown.) The bolsters (lettered G H) are, as usual, located over the axles and are retained in place, as usual, by the pins I J, which pass downward through said bolsters, the wagon-reach D, and axles A B. The axles A B are furnished with the usual sand-boards K, and the ends of the reach D are between these sand-boards K and the upper surfaces of the axles A B.

The bolsters G H are respectively provided with the standards L M, the standards L on the front bolster being preferably rigid and the standards M on the rear bolster H being preferably pivotally secured, so as to be turned downward and rearward from their vertical position (illustrated by full lines in Figs. 7 and 8) to a horizontal position, as indicated by dotted lines in Fig. 7 and by full lines in Fig. 9. The standards M on the rear bolster H correspond exactly with one another, and each is provided with the metal strap N, which is secured at its ends to the opposite sides of the standard, and about its middle portion is fashioned into the circular loop O, which passes around the reduced circular end P of the bolster and is slotted, as at Q, to pass over the pin R, which is rigid with the bolster and extends rearward from about the transverse center of same, as indicated in Figs. 7, 8, and 9. When the standard M is turned downward and rearward, as shown in Fig. 9, the end of the slot Q in the loop or band O will reach the pin R and by contacting therewith form a stop to prevent the standard M from turning unduly downward. When the standard M is returned to its vertical position, (shown by full lines in Fig. 7,) the slot Q in the loop or band O will pass along the sides of the pin R, and said pin will upon the standard M reaching its upright position be engaged by the aperture S in the spring-catch T, and thereby the standard M will be locked in its upright position. The catch T is a metallic strip secured at its upper end to the side of the standard M and at its lower end flexed against the forward side of the loop or band O, as indicated in Figs. 7 and 9. When the standard M is turned to its upright position, the lower outwardly-turned end of the catch T will pass over the end of the pin R until the aperture S in said catch has reached said pin, and at this time the spring tension of the catch T will move said catch inward, the pin R then passing through the said aperture S, at which time the said catch T and pin R will effectually lock the standard M in its upright position. In order to turn the standard M downward and rearward, it is necessary to manually free the lower end of the catch T from the pin R and then press the upper portion of the standard M rearward, whereby the standard is caused to turn downward and toward the rear, the reduced end P of the bolster operating at such time as a pivotal bearing for the standard. It is desirable not only that the standard M may be locked in its upright position and be capable of being turned downward and rearward, but that said standard may when turning downward and rearward have a slight outward motion imparted to it in order that it may effectually clear itself from the load of lumber or other material which may be upon the wagon. The means I have provided for effecting the outward motion of the standard M is the strap V, which extends downward along the outer side of the standard M, and thence turns outward and is pivotally secured by a pin W upon the outer end of the bolster H. If the pin W were applied centrally to the end of the bolster, the standard M would turn downward and rearward, but would not during such operation turn outward from the load on the wagon. The strap V not only performs the function of pulling the upper portion of the standard M outward when said standard is turned downward and rearward, but affords support and strength for said standard. The strap V extends along the outer side of the standard M and along the inner side of the standard M and at the upper end of said standard curves upward therefrom to form the eye X, as shown more clearly in Fig. 9. The rear hound a has its ends secured between the sand-board K and axle B, and the curved portion of said hound extends forward, as shown in Figs. 1, 4, and 5. The hound a supports the loop b, which at opposite sides of the reach D is suspended from said hound and which along its transverse portions passes below the wagon-reach D and retains the latter in close relation to the lower surface of said hound. When the wagon is not desired to have its front and rear axles turn in the manner illustrated in Fig. 5, a pin d will be passed through said hound a and wagon-reach D, and thereby the rear axle B, hound a, and reach D will be readily connected with one another. When the pin d is not in position connecting the hound a and reach D together, the rear axle B may turn upon the pin J, which, as above described, passes downward through the rear bolster H, rear sand-board K, and rear axle B. When the pin d is not employed for connecting the rear hound a and reach D together, the crossed rods (lettered e f, respectively) will be made use of to connect the front and rear axles of the wagon together and to compel the rear axle to take a radial position and follow the turns or curves made by the front axle. The rods e f are detachable from the wagon, and when the wagon is to be used for purposes not necessitating the employment of the rods e f the latter may be removed and the rear hound and reach D may be locked together by means of the pin d. The ends of the rods e f are hooked into swiveled plates g, one of which is shown on an enlarged scale in Fig. 3 and which are apertured at their outer ends to receive the hooked ends of the rods e f and at their inner ends are mounted upon the bushings h, held upon the bolts i and below the axles A B by means of the nuts j. The bolts i, while securing the swiveled plates g, also secure the rear hound a and front hound E. The plates g are by the means specified pivotally secured, and hence they will follow the direction of the crossed rods e f, turning with said rods and keeping in line therewith, as clearly indicated in Fig. 5. The rods e f will substantially correspond with one another, with the exception that one end of the rod f will be provided with the fastening and locking means illustrated in detail in Fig. 6. Both ends of the rod e will be provided with hook-shaped extremities (denoted in Fig. 3) adapted to pass through the apertures in the outer ends of the plates g, and one end of the rod f will be provided with a like hook-shaped extremity, while its other end will be furnished with the fastening means shown in Fig. 6, which means comprises the connected links k m, hook n, and loop o. The link k is carried adjacent to the end of the rod f, and link m connects the hook n with the said link k, and upon the link k is arranged the slidable loop o. The rods e f when in use should be taut, and when both ends of the rod e have been secured to their plates g and one end of the rod f has been secured to its plate g it would be difficult to hook the other end of the rod f upon its plate g, since said rod $f$ after being hooked must be taut, and hence said rod is naturally not of sufficient length to enable it to be hooked at its final end upon its plate $g$ by means of the hook shown in Fig. 3. It is for this reason that the means shown in Fig. 6 have been provided, and in applying this means to the plate $g$ the slidable loop $o$ is freed from the hook $n$, and the latter is passed through the aperture in the plate $g$ and then pulled downward toward the link $k$, as shown in Fig. 6, and thereupon the loop $o$ is slipped upon the end of the hook $n$, so as to secure it. The length and shape of the hook $n$ are such that it may be passed into the aperture of the plate $g$ and then pulled downward as a lever to draw the rod $f$ taut. The loosening of the rods $e f$ from the wagon will be accomplished by first freeing the loop $o$ from the hook $n$ (shown in Fig. 6) and then detaching the rod $f$, after which the rod $e$ may be readily detached at will, since the axles A B will then yield, so as to enable the convenient removal of the rod $e$. The rods $e f$ cross one another, as shown in Figs. 1 and 5, and form a letter X. The employment of the rods $e f$ results in the capacity in the wagon of having the rear axle B turn on radial lines in conjunction with the turning of the front axle A. When the front and rear axles are permitted to turn, as shown in Fig. 5, the wagon may make a very short turn with safety, and during the turning of the rear axle the rear hound $a$ will slide through the loop $b$, the latter remaining upon the rod D, as shown.

In instances in which it is not desired that the front and rear axles shall turn in unison, as shown in Fig. 5, the crossed rods $e f$ may be detached from the swiveled plates $g$ and the rear hound $a$ will then be locked to the rod D by means of the pin $d$, as shown in Fig. 4. The rods $e f$ will be provided with one or more links, as indicated at $q$, so as to render them somewhat flexible and capable of being easily applied to and removed from the swiveled plates $g$.

By means of the links $q$ the rods $e f$ may be lengthened when desired to become adjusted thereby to any lengthening of the wagon, which would result from the rear axle B being moved rearward upon the rod D. The lengthening of the rods $e f$ may be accomplished by adding to them additional links $q$ or by substituting longer links in them for the links shown. The method of lengthening or shortening the rods $e f$ may be performed in any of the various ways with which mechanics are familiar.

What I claim as my invention, and desire to secure by Letters Patent, is—

1. In a wagon, the wheels, front and rear axles, and the reach connecting said axles, combined with the rear hound $a$ of semicircular form and projecting forward from the rear axle, the loop slidable on said rear hound and connecting the latter and said reach, and the crossed rods $e, f$, connecting the said front and rear axles; substantially as set forth.

2. In a wagon, the wheels, the front and rear axles, the front and rear sand-boards, the front and rear bolsters, and the front and rear hounds, the latter being secured between the sand-boards and axles, combined with the reach extending between the said sand-boards and axles, the crossed rods $e, f$, connecting said axles, and the plates $g$ swiveled on the lower sides of said axles in substantial alinement with the outer portions of said hounds and receiving the outer ends of said crossed rods; substantially as set forth.

3. In a wagon, the wheels, the front and rear axles, the front and rear sand-boards, the front and rear bolsters, and the bolts $i$ which pass through said sand-boards and axles at opposite sides of the vertical center of the latter, combined with the plates $g$ swiveled upon the lower ends of said bolts and below said axles, and the crossed rods $e, f$, hooked at their ends into the eyes at the outer ends of said plates $g$; substantially as set forth.

4. In a wagon, the wheels, the front and rear axles, and the plates $g$ swiveled upon the lower side of said axles, combined with the crossed rods $e, f$, hooked at their ends into eyes at the outer ends of said plates, and one of said rods at one end having the link $k$, link $m$, pivoted hook $n$, and fastening-slide $o$; substantially as set forth.

Signed at New York, in the county of New York and State of New York, this 22d day of April, A. D. 1898.

ADRIAN HITT.

Witnesses:
CHAS. C. GILL,
E. JAS. BELKNAP.